United States Patent
Porikli et al.

(10) Patent No.: US 8,494,305 B2
(45) Date of Patent: Jul. 23, 2013

(54) IMAGE FILTERING BY SPARSE RECONSTRUCTION ON AFFINITY NET

(75) Inventors: Fatih Porikli, Watertown, MA (US); Rajagopalan Sundaresan, Tucson, AZ (US)

(73) Assignee: Mitsubishi Electric Research Laboratories, Inc., Cambridge, MA (US)

( * ) Notice: Subject to any disclaimer, the term of this patent is extended or adjusted under 35 U.S.C. 154(b) by 0 days.

(21) Appl. No.: 13/330,795

(22) Filed: Dec. 20, 2011

(65) Prior Publication Data

US 2013/0156340 A1    Jun. 20, 2013

(51) Int. Cl.
*G06K 9/40* (2006.01)
*G06K 9/62* (2006.01)
(52) U.S. Cl.
USPC ............ 382/275; 382/260; 382/225
(58) Field of Classification Search
USPC ................. 382/159, 260, 276, 275
See application file for complete search history.

(56) References Cited

U.S. PATENT DOCUMENTS

| | | | | |
|---|---|---|---|---|
| 8,184,913 B2* | 5/2012 | Baker et al. | | 382/218 |
| 8,290,251 B2* | 10/2012 | Mahajan et al. | | 382/159 |
| 8,340,463 B1* | 12/2012 | Cho et al. | | 382/276 |
| 2008/0170623 A1* | 7/2008 | Aharon et al. | | 375/240.22 |
| 2010/0020208 A1* | 1/2010 | Barbu | | 348/250 |
| 2010/0254614 A1* | 10/2010 | Baker et al. | | 382/218 |
| 2011/0064302 A1* | 3/2011 | Ma et al. | | 382/159 |

OTHER PUBLICATIONS

S. Foucher, SAR image filtering via learned dictionaries and sparse representations, IEEE International Remote Sensing and Geoscience Symposium, 2008.*

Porikli, et al, SAR Despeckle Filtering by Sparse Coding on Affinity Nets (SCAN), Mitsubishi Electric Research Laboratories http://www.merl.com, Apr. 2012.*

* cited by examiner

*Primary Examiner* — Andrae S Allison
(74) *Attorney, Agent, or Firm* — Dirk Brinkman; Gene Vinokur

(57) ABSTRACT

A method reduces multiplicative and additive noise in image pixels by clustering similar patches of the pixels into clusters. The clusters form nodes in an affinity net of nodes and vertices. From each cluster, a dictionary is learned by a sparse combination of corresponding atoms in the dictionaries. The patches are aggregated collaboratively using the dictionaries to construct a denoised image.

19 Claims, 3 Drawing Sheets

IMAGE FILTERING BY SPARSE RECONSTRUCTION ON AFFINITY NET

FIELD OF THE INVENTION

This invention relates generally to images, and more particularly to despeckling synthetic aperture radar (SAR) images.

BACKGROUND OF THE INVENTION

Synthetic aperture radar (SAR) images are generated by transmitting electromagnetic waves as pulses. These pulses are reflected by a target. Received pulses are coherently integrated.

Because of the nature of data acquisition, SAR images are inherently affected by speckle noise and artifacts. Speckle noise is caused by coherent processing of backscattered signals from multiple distributed targets. Speckle noise is often modeled as multiplicative noise as $$y_i = x_i * z_i, \quad (1)$$

where $y_i$, $x_i$ and $z_i$ correspond to the noisy, original, and noise intensities of the $i^{th}$ pixel, respectively.

Some methods use a logarithmic (log) transform to convert the multiplicative noise to an additive representation, and then apply additive noise filtering. Those methods are based on either wavelet shrinkage, global local averages, or dictionary learning.

The wavelet shrinkage uses a fixed complete (decimated and undecimated) wavelet bases on a log-intensity image where the wavelet transform coefficients are thresholded in an adaptive fashion to remove high frequency noise.

Instead of using fixed complete bases, another method extracts a global over-complete dictionary from the data and uses a sparse representation to suppress the incoherent noise. Even though that method may generate better results for Gaussian distributed noise in comparison to wavelet shrinkage techniques, the use of a single over-complete dictionary causes over-smoothing, especially when input and reconstruction blending parameter are not preset accurately.

A probabilistic patch based (PPB) filter uses a nonlocal means approach, and poses the problem of denoising as a weighted maximum likelihood estimation problem.

A nonlocal means method obtains a pixel estimate by determining a weighted average of all similar patches in the image. Those weights are directly proportional to the similarity of the patch surrounding a reference pixel and the patch surrounding candidate pixels in a search window. The weights are refines iteratively by including patches from the estimate of the image parameters. PPB can cope with non-Gaussian distributed noise, however, PPB also removes thin and dark details in the images.

SUMMARY OF THE INVENTION

The embodiments of the invention provide a method for despeckling synthetic aperture radar (SAR) images. The method is based on sparse coding by dictionary learning and collaborative filtering.

First, an affinity net is formed by clustering similar image patches that are represented as nodes in the net. For each cluster, an under-complete dictionary is learned from the cluster nodes using an alternative decision process applied to the affinity net.

The nodes in the same cluster are coded by a sparse combination of corresponding dictionary atoms. The reconstructed patches are collaboratively aggregated to construct a denoised image. Experimental results demonstrate superior performance, when compared with the prior art, for removal of the speckle caused by multiplicative noise.

DETAILED DESCRIPTION OF THE PREFERRED EMBODIMENT

Figure 1:
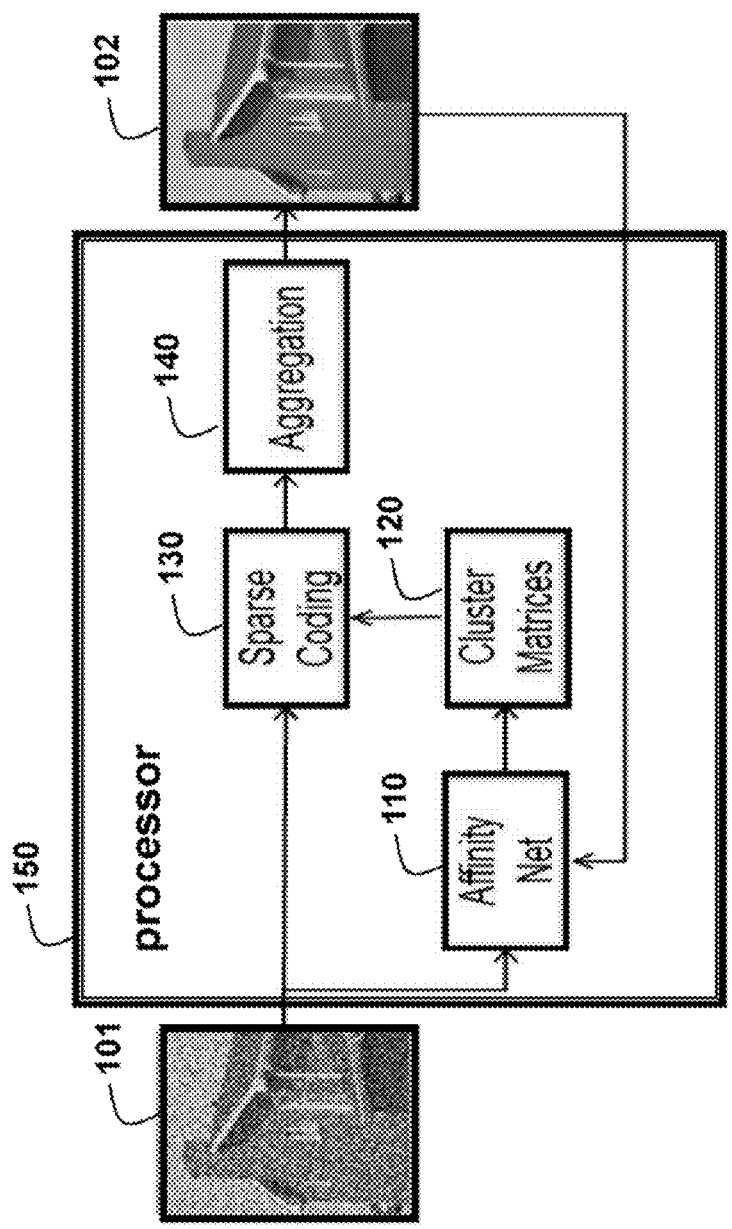
FIG. 1 is a flow diagram of a method for despeckling a synthetic aperture radar image according to embodiments of the invention.

As shown in FIG. 1, the embodiments of our invention provide a method for despeckling a synthetic aperture radar (SAR) image 101, that is, reducing multiplicative and additive noise in an image. The method reduces the multiplicative noise by using localized dictionary learning on an affinity net to prevent over-smoothing and removal important details in a denoised image 102.

We start by determining an appearance similarity graph, called as an affinity net 110, from the noisy input image 101. In the affinity net, each node corresponds to an image patch and each vertex corresponds to an affinity (similarity) between two nodes.

For each central node, we determine a cluster of nodes that are similar to the central node, from which we form a cluster matrix 120. For each cluster, an under-complete dictionary is learned using an alternative decision method. The cluster matrix is decomposes into a linear function of the dictionary and sparse coding coefficients 130 to learn the dictionary that best represents coherent variations in the cluster.

The nodes in the same cluster are coded by a sparse combination of corresponding dictionary atoms. The reconstructed patches are collaboratively aggregated 140 using the dictionaries to construct the denoised image 102.

The dictionary is initialized. Input to the reconstruction is the clusters 120. A projection error is determined for given cluster columns, from which inter-coefficient convergence is determined.

Sparse coefficients are selected as the set that gives minimum projection and divergence errors, which is used to update the dictionary.

For a termination criterion, a residual is determined, which yield the coefficients for the dictionary.

It is understood that manipulating the millions of pixels is extremely difficult. Therefore, the above steps are be performed in a processor 100 connected to a memory and input/output interfaces as known in the art. The above steps are now described in greater detail.

We set the size of the dictionary as under-complete, i.e., much smaller than a rank of the cluster matrix, to limit the amount of the consistent variations for the clustered nodes and to impose a stronger collaborative constraint. As a result, each cluster is represented and filtered by its own unique small dictionary.

After learning the dictionary for the current cluster, we reconstruct the nodes by orthogonal matching pursuit (OMP) procedure. The main difference between OMP and MP is that the coefficients are an orthogonal projection of signals on the dictionary to obtain a sparse coded representations.

Because a single node can participate in different clusters, there can be overlap among the clusters, and hence we obtain multiple estimates for an image pixel. The final estimate is obtained by an aggregating the multiple estimates.

The adaptation of under-complete dictionaries to nonlocal variations through clusters present in the image enables us to remove noise without any assumption on the shape and variance of the noise function.

Sparse Reconstruction on Affinity Nets

Figure 2:
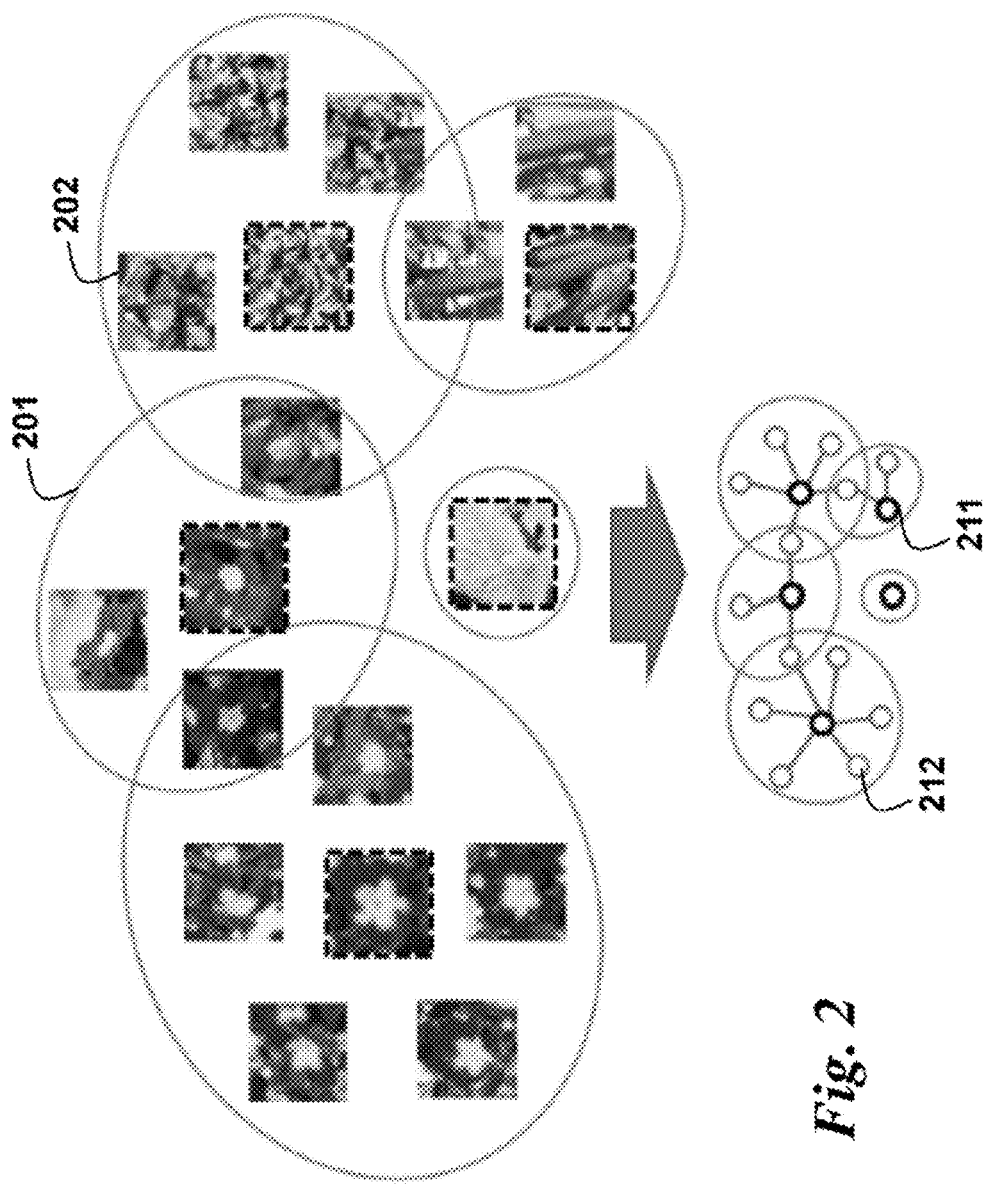
FIG. 2 is a schematic of clustered image patches used to construct an affinity net according to embodiments of the invention.

We apply a log-transform to impose additive filtering in a log-intensity domain instead of multiplicative filtering in the intensity domain of the input image. FIG. 2 shows the filtering procedure for a simple affinity net for flower images 201. Note that some nodes may be singular with no vertex. The affinity net contains as many clusters as the number of nodes.

Affinity Net

The affinity net is an undirected graph based representation of all image patches where each node corresponds to an image patch 202 and the weight of each vertex corresponds to the similarity of two patches it belongs to. In other words, the affinity net is a weighted graph where the weights ω correspond to similarities between the patches.

The affinity between two vector from image patches $p_i$ and $p_j$ is determined by the dot product of two patch vectors as $$\omega(p_i, p_j) = \langle p_i, p_j \rangle = \sum_{k=1}^{K} p_{i,k} p_{j,k} \qquad (2)$$

where k is a index, and K is a patch size, e.g., the number of pixels contained in a patch. Before the dot product computation, the patch coefficients can be normalized such that the patch vectors are evenly distributed around an origin point, where a mean patch computed for all the given patches maps onto after the normalization.

Although there are many metrics that can be used to measure the affinity between image patches, the dot product in Eqn. 2 is preferred because it does not bias any frequency or intensity value. In a feature space, the result of constructing the affinity net is the grouping of the nodes that have similar feature coordinates. The affinity net is fully connected.

To concentrate on more similar patches and significantly decrease the computational load, we only retain the vertices that have sufficiently higher weights, i.e., w>τ. The threshold τ is selected such that more than two patches form a cluster for most of the clusters. The performance is not sensitive to τ, which can be relaxed to a wide range of values as long as it provides sufficient number of patches. In case singular nodes without any affinity values above the threshold exist, the affinity net may is not be fully connected.

A cluster $C_i$ is represented as $$c_i = \{p_j \in c_i : \omega(p_i, p_j) > \tau, i = 1, \ldots, N\} \qquad (3)$$

for N patches (if all pixels are represented by assigned patches then the number of pixels) in the image. If the affinity between two nodes is high, then a node is attached to the cluster of the other node as shown in FIG. 2.

Depending on the self-similarity of the image, clusters can be different sizes. The dark circles 111 represent the reference nodes, and the light circles 212 are in their corresponding clusters. A reference node might not contain any similar nodes and hence the cluster size is one. Also, a single node can be present in one or more clusters and participate in collaborative filtering in each cluster they are present. In this case, we will obtain multiple estimates of a node.

Cluster Matrix Construction

Figure 3:
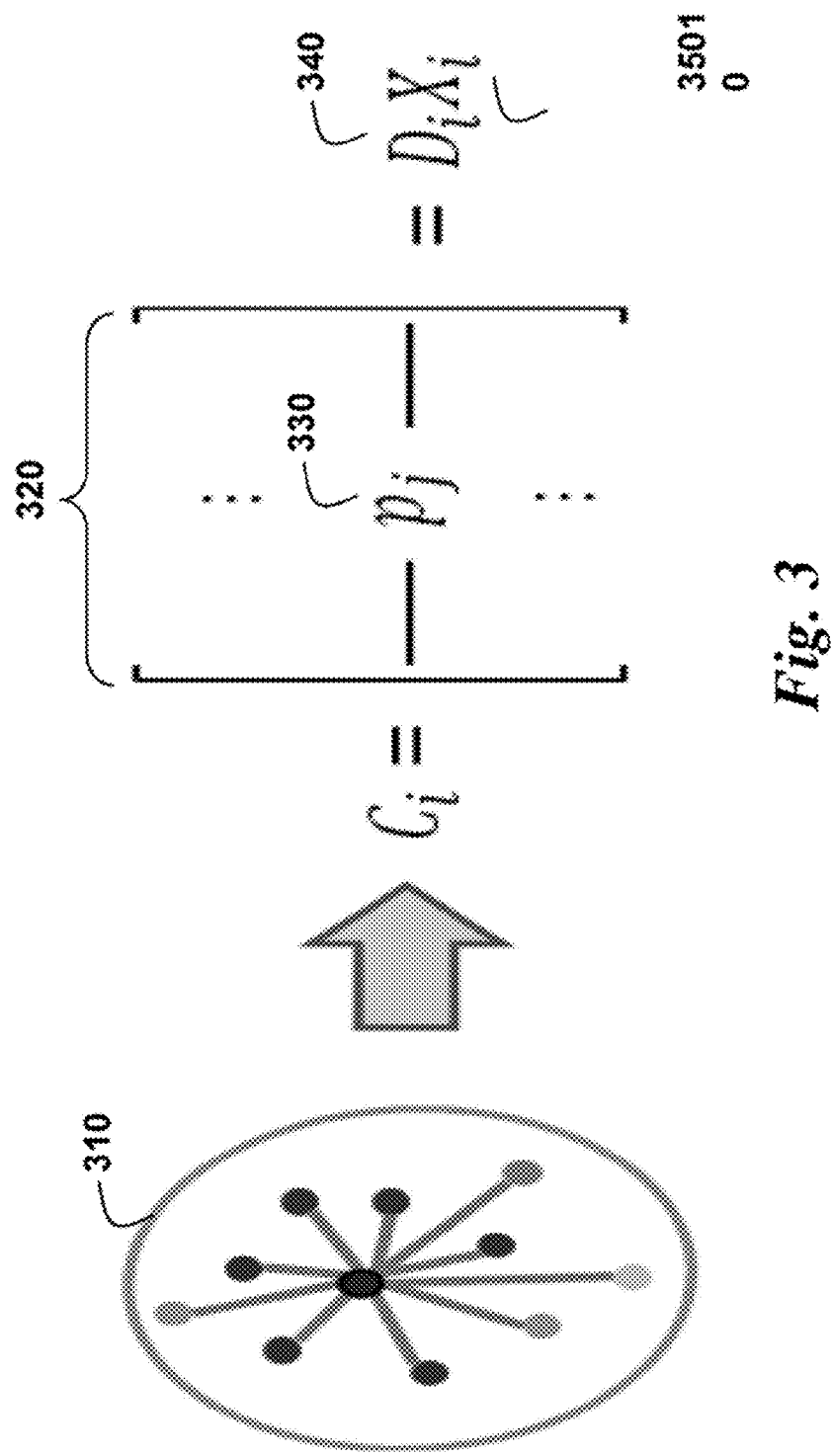
FIG. 3 is a schematic of arranging an affinity net into a cluster matrix according to embodiments of the invention.

As shown in FIG. 3, data from a cluster $c_i$ 310 in the affinity net are arranged into a cluster matrix $C_i$ 320. Each node or patch $p_j$ 330, where $\omega(p_i, p_j) > \tau$, corresponds to a column in the matrix $C_i$. A reference patch is also included. While arranging similar patches $p_j$ as a matrix, the patches are ordered according to their similarities with the reference patch $p_i$. Each column of the cluster matrix is a different patch in the cluster. Each row of the cluster matrix corresponds to the values of the same pixels in different patches.

The variation along the rows of the cluster matrix is small because all the patches in the cluster are similar to the reference patch. It should also be noted that the number of rows in this matrix is the dimensionality of the patch, while the number of columns corresponds to the number of similar nodes. Due to this special similarity imposed structure of the cluster matrix, an under-complete local (cluster-wise) dictionary $D_i$ 340 with very few atoms can be used to reconstruct the cluster matrix efficiently with small reconstruction error.

Our main intuition is that the variation along the columns (patches) can be represented as a linear combination of a few basis atoms in the dictionary. Thus, our local dictionary is extremely under-complete, where the number of the columns of the dictionary is much smaller than the number of its rows (the patch size). In one embodiment, the dictionary has only two atoms, which converts the problem to a binary clustering. Similarly, in another embodiment, there is only one dictionary atom, which corresponds to mapping of the cluster matrix on a one-dimensional linear subspace (e.g. onto a line).

In another embodiment, the cluster matrix is constructed by arranging the patches of the cluster as rows of the cluster matrix. In this case, each row of the cluster matrix is a different patch in the cluster. Each column of the cluster matrix corresponds to the values of the same pixels in different patches. This arrangement enables us to represent the variation along the rows (pixels) as a linear combination of dictionary atoms instead of the variation along the columns (patches).

We obtain jointly the sparsest signal X* 350 and the dictionary D by determining the minimum of this optimization problem:

$$X^* = \arg\min_{X} \|X\|_0 \text{ subject to } \|DX - C\|_2^2 \leq \varepsilon, \qquad (4)$$

where we impose an $l_0$ norm to obtain the sparsest representation. Alternatively, we use an $l_1$ norm to impose for the sparsity while solving a convex minimization problem. Here, X corresponds to the sparse reconstruction coefficients obtained using the dictionary D, and ε corresponds to an error threshold, which we set to the noise variance in the image in one embodiment. To jointly learn the dictionary and the sparse representation, we alternate between two stages: a sparse coding stage, and a dictionary update stage to solve an optimization problem using a singular value decomposition procedure. Note that we learn a separate dictionary for each cluster.

We apply k-means clustering, with a small k<n, to obtain our initial under-complete dictionary, where n is the number of rows in the matrix corresponding to the sparsest signal, which also corresponds to the number of patches in the image. The two-step process solves the following objective function $$(D, X^*) = \underset{D,X}{\operatorname{argmin}} \lambda \|DX - C\|_2^2 + \mu \sum_i \|x_i\|_0 + \sum_i \|Dx_i - R_i X\|_2^2, \quad (5)$$

where $\lambda$ is a scalar to regulate the fidelity of the reconstruction to the given noisy data, $\mu$ is a scalar to adjust the amount of the imposed sparsest in the reconstruction, C represents the cluster matrix of given noisy patches, X the reconstruction results (weakly assumed to noise free), and $R_i$ the patch index operator that imposes additional reconstruction error minimization on each patch.

There are different ways of applying the sparse coding stage, for example, using the matching pursuit process to compute the representation vectors iteratively. The codebook update stage can be applied to each column (atom) of the dictionary by first defining the group of noisy patches that use the current atom then computing the overall representation error matrix for this group without using the current atom, and then applying singular value decomposition to assign the first column of the left decomposition matrix as the new updated atom After the dictionary learning and sparse coefficient computation stage, the reconstructed patches are assigned to the same pixel locations from where they are extracted. Because patches are mostly overlapping, there are multiple estimates for a given pixel. The final estimate is obtained by computing the average of all the pixel estimates. This process obtains a sparse representation of all the noisy patches by averages them. This procedure represents the commonly shared patterns and rejects random noise.

The dictionary learning and coding process is repeated for all nodes present in the affinity net on their own clusters. The final denoised image estimate is obtained as $$\hat{X} = \sum_i \left( \frac{\sum_{j \in c_i} D_{i,j} X^*_{i,j}}{\sum_{j \in c_i} l_{i,j}} \right), \quad (6)$$

where i is the index over the space containing all the patches, $c_i$ is a cluster of similar nodes. The denominator corresponds to the number of estimates obtained for each pixel. Thus, for more than one estimate for a pixel, we average all the estimates.

Because the noisy image is log-transformed in the first step, we subtract the nonzero mean of the noise, and take the exponent of the final estimate to produce the denoised image.

Regularization for Reconstructed Patches

The objective function given in Equation 5 does not explicitly enforce the cluster matrix columns to have similar reconstruction coefficients but requires their 'gradients' to be decomposed and represented by the learned dictionary atoms in the under-complete dictionary as the coefficients of the atoms in the reconstruction can add a constant term in case one of the atoms in the dictionary correspond to an all-ones vector.

To enforce the reconstructed patches in the same cluster to have similar intensity values, we add a novel inter-coefficient divergence term in the objective function to penalize for the coefficient divergences:

$$(D, X^*) = \underset{D,X}{\operatorname{argmin}} \lambda \|DX - C\|_2^2 + \mu \sum_i \|x_i\|_0 + \sum_i \|Dx_i - R_i X\|_2^2 + \lambda_2 \sum_i \sum_j \|x_i - x_j\|^2, \quad (7)$$

where the last term can also be defined as $$\lambda_2 \sum_i \operatorname{var}(x_i), \quad (8)$$

in another embodiment.

EFFECT OF THE INVENTION

The method for reducing multiplicative and additive noise in images is based on dictionary learning on affinity nets. Our filter takes advantage of a sparse representations in each cluster and removes speckle by a sparse approximation of each cluster.

In contrast with the prior art that uses a single dictionary to represent all the image patches, our method has one small under-complete dictionary for each cluster. This provides a significant performance improvement.

Although the invention has been described by way of examples of preferred embodiments, it is to be understood that various other adaptations and modifications can be made within the spirit and scope of the invention. Therefore, it is the object of the appended claims to cover all such variations and modifications as come within the true spirit and scope of the invention.

We claim:

1. A method for reducing multiplicative and additive noise in an image including pixels, comprising the steps of:
   clustering similar patches of the pixels in the image into clusters, wherein the clusters form nodes in an affinity net of nodes and vertices;
   learning, from each cluster, a dictionary by a sparse combination of corresponding atoms in the dictionaries, wherein the dictionary is under-complete when a size of the dictionary is much smaller than a rank of the cluster matrix; and
   aggregating collaboratively the patches using the dictionaries to construct a denoised image, wherein the steps are performed in a processor.

2. The method of claim 1, wherein the image is a synthetic aperture radar (SAR) and a pattern of the noise pattern is speckle noise and artifact.

3. The method of claim 1, wherein the learning uses an alternative decision process applied to the affinity net.

4. The method of claim 1, wherein the nodes correspond to the patches and the vertices correspond to similarity between the nodes.

5. The method of claim 1, wherein each cluster is in a form of a cluster matrix, and further comprising:
   decomposing each cluster into a linear function of the corresponding dictionary and sparse coding coefficients to learn the dictionary that best represents coherent variations in the cluster.

6. The method of claim 5 wherein the learning further comprises:
   determining a projection error for columns of the cluster matrix;

determining inter-coefficient convergence from the projection errors;

selecting sparse coefficients as a set that gives a minimum projection and divergence errors to update the dictionary; and determining a residual as a termination criterion.

7. The method of claim 6, further comprising:
adding an inter-coefficient divergence term in an objective function to penalize for coefficient divergences.

8. The method of claim 7, wherein the dictionary D and sparse coefficients X are determined by optimizing an objective function $$(D, X^*) = \underset{D,X}{\mathrm{argmin}} \lambda \|DX - C\|_2^2 +$$

$$\mu \sum_i \|x_i\|_0 + \sum_i \|Dx_i - R_i X\|_2^2 + \lambda_2 \sum_i \sum_j \|x_i - x_j\|^2,$$

where argmin return a minimal value, $\lambda$ is a scalar to regulate a fidelity an a reconstruction to the image, $\mu$ is a scalar to adjust an amount of a imposed sparseness in the reconstruction, C represents the cluster matrix, $R_i$ is a patch index operator, and $\lambda_2$ is a scalar to regulate a divergence between sparse coefficients.

9. The method of claim 5, wherein the cluster patches are arranged as columns of the cluster matrix.

10. The method of claim 1, further comprising:
filtering each cluster by the corresponding dictionary.

11. The method of claim 1, further comprising:
reconstructing the nodes by a orthogonal matching pursuit procedure.

12. The method of claim 1, wherein single node can participate in different clusters.

13. The method of claim 1, wherein some nodes are singular without vertices.

14. The method of claim 1, wherein the affinity net is a weighted a weighted graph where weights $\omega$ correspond to similarities between the patches.

15. The method of claim 1, wherein an affinity between patches $p_i$ and $p_j$ is determined as $$\omega(p_i, p_j) = \langle p_i, p_j \rangle = \sum_{k=1}^{K} p_{i,k} p_{j,k}, \qquad (2)$$

where k is a index, and K is a size of the patch in pixels.

16. The method of claim 15, further comprising:
retaining only patches where the weight w is greater than a threshold $\tau$.

17. The method of claim 1, wherein the dictionary has only two atoms.

18. The method of claim 1, wherein the dictionary has one atom.

19. The method of claim 1, further comprising:
applying a logarithm-transform to the image;
subtracting a nonzero mean of the noise from the logarithm-transformed image; and
taking an exponent of a final estimate to produce the denoised image.

* * * * *